United States Patent
An et al.

(10) Patent No.: US 9,088,699 B2
(45) Date of Patent: Jul. 21, 2015

(54) IMAGE COMMUNICATION METHOD AND APPARATUS WHICH CONTROLS THE OUTPUT OF A CAPTURED IMAGE

(75) Inventors: Young-hun An, Yongin-si (KR); Myung-hoon Ahn, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 538 days.

(21) Appl. No.: 13/212,475

(22) Filed: Aug. 18, 2011

(65) Prior Publication Data

US 2012/0044364 A1 Feb. 23, 2012

(30) Foreign Application Priority Data

Aug. 19, 2010 (KR) ........................ 10-2010-0080411

(51) Int. Cl.
*H04N 5/262* (2006.01)
*H04N 7/18* (2006.01)

(52) U.S. Cl.
CPC ...................................... *H04N 7/183* (2013.01)

(58) Field of Classification Search
CPC .. H04N 5/23293; H04N 5/232; H04N 5/2628
USPC ....... 348/222.1, 239, 333.01, 333.12
See application file for complete search history.

(56) References Cited

U.S. PATENT DOCUMENTS

| 5,559,554 | A * | 9/1996 | Uekane et al. ........... 348/333.02 |
| 5,761,344 | A | 6/1998 | Al-Hussein |
| 7,151,860 | B1 * | 12/2006 | Sakai et al. .................. 382/297 |
| 2004/0061797 | A1 * | 4/2004 | Takahashi et al. ....... 348/333.01 |
| 2007/0064112 | A1 | 3/2007 | Chatting et al. |
| 2008/0117307 | A1 * | 5/2008 | Sato ......................... 348/333.01 |
| 2008/0266380 | A1 | 10/2008 | Gorzynski et al. |
| 2009/0136135 | A1 * | 5/2009 | Eom et al. ...................... 382/181 |
| 2009/0147990 | A1 * | 6/2009 | Lev ................................. 382/100 |
| 2010/0284611 | A1 * | 11/2010 | Lee et al. ................... 348/222.1 |

FOREIGN PATENT DOCUMENTS

JP 2005191964 7/2005

OTHER PUBLICATIONS

Extended European Search Report dated Jul. 19, 2012 issued in EP Application No. 11178006.0.
EP Communication issued on Mar. 11, 2014.
Decision to Refuse a European Patent Application dated Apr. 15, 2015 in European Patent Application No. 11178006.0.
Result of Consultation dated Mar. 6, 2015 in European Patent Application No. 11178006.0.

* cited by examiner

*Primary Examiner* — Gevell Selby

(74) *Attorney, Agent, or Firm* — Staas & Halsey LLP

(57) ABSTRACT

A user terminal and an image communication method and apparatus include outputting a captured image without performing left-and-right reversion when the captured image includes a symbol. Further, an image camera includes an image generate to generate a captured image, and a camper control unit to transmit the captured image to a user terminal without performing left-and-right reversion when the captured image includes a symbol.

39 Claims, 4 Drawing Sheets

FIG. 4
 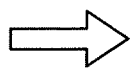 
(a) (b)
 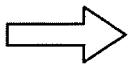 
(c) (d)

IMAGE COMMUNICATION METHOD AND APPARATUS WHICH CONTROLS THE OUTPUT OF A CAPTURED IMAGE

CROSS-REFERENCE TO RELATED APPLICATIONS

This application claims priority under 35 U.S.C. §119(a) from Korean Patent Application No. 10-2010-0080411, filed on Aug. 19, 2010, in the Korean Intellectual Property Office, the disclosure of which is incorporated herein in its entirety by reference.

BACKGROUND

1. Field of the Invention

The present general inventive concept generally relates to an image communication method and apparatus, and more particularly, to an image communication method and apparatus which controls the output of a captured image according to whether the captured image includes a symbol.

2. Description of the Related Art

The development of communication technology has now led to image communication which allows users to communicate while seeing each other. The image communication is carried out by transmitting an image captured by a camera to a partner terminal. The image captured by the camera is output on a screen of a user terminal and at the same time, is transmitted to the partner terminal over a communication network, thus being output on the partner terminal.

Since persons are generally accustomed to their images in a mirror, they perceive their images more natural when a captured image of a user is right-and-left reversed and thus a mirror image as if the user is reflected in a mirror is output, than when the original captured image is output on a screen of the user terminal. Consequently, the user terminal often outputs the mirror image, which is the right-and-left reverse image of the captured image, onto the screen of the user terminal and at the same time, communicates the mirror image to the partner terminal.

However, if the captured image includes a symbol, such as a character or a number, the symbol included in the mirror image is also the right-and-left reverse image of the original one, thereby making it difficult to be read.

SUMMARY

The present general inventive concept provides an image method and apparatus which controls left-and-right reversion of a captured image according to whether the captured image includes a symbol.

Additional features and utilities of the present general inventive concept will be set forth in part in the description which follows and, in part, will be obvious from the description, or may be learned by practice of the present general inventive concept.

According to an feature of the present general inventive concept, there is provided an image communication method including outputting a captured image without performing left-and-right reversion on the captured image when the captured image includes a symbol.

In an exemplary embodiment, the outputting of the captured image may include transmitting the captured image to a partner terminal over a communication network.

The outputting of the captured image may include displaying the captured image on a screen.

The image communication method may further include capturing the captured image to obtain a still image.

The capturing of the captured image may include capturing the captured image at predetermined time intervals to obtain a still image.

The image communication method may further include determining whether the captured still image comprises a symbol.

The determining of whether the captured still image includes a symbol may include extracting a symbol region from the captured still image and determining whether the captured still image includes a symbol by comparing the symbol included in the symbol region with a symbol previously stored in a database.

The image communication method may further include outputting the captured image according to a user-set output scheme or a default-set output scheme if captured still image does not comprise a symbol.

The user-set output scheme or the default-set output scheme may be one or more of a scheme to output the captured image without performing left-and-right reversion on the captured image and a scheme to perform left-and-right reversion on the captured image and outputting a mirror image thereof.

The image communication method may further include generating control information indicating whether captured still image includes a symbol and transmitting the control information to the image camera through an interface.

The image communication method may further include receiving the captured image which has not been left-and-right reversed from the image camera through the interface if the control information indicates that the captured still image includes a symbol.

The outputting of the captured image without performing left-and-right reversion on the captured image may include outputting the captured image received from the image camera through the interface without performing the left-and-right reversion on the captured image.

According to another feature of the present general inventive concept, there is provided an image communication method including generating a captured image and transmitting the captured image to a user terminal without performing left-and-right reversion on the captured image if the captured image includes a symbol.

The image communication method may further include transmitting the captured image to the user terminal according to a transmission scheme which is set by a user or a transmission scheme which is set by default if the captured image does not include a symbol.

The transmitting of the captured image to the user terminal may include one of transmitting the captured image to the user terminal without performing left-and-right reversion on the captured image and transmitting a mirror image, which is a left-and-right reverse image of the captured image, to the user terminal.

The image communication method may further include determining whether the captured image includes a symbol.

The transmitting of the captured image to the user terminal may include transmitting the captured image to the user terminal through an interface.

The image communication method may further include receiving control information indicating whether the captured image includes a symbol from the user terminal through the interface, in which the transmitting of the captured image to the user terminal includes transmitting the captured image to the user terminal without performing left-and-right reversion on the captured image if the control information indicates that the captured image includes a symbol.

According to another feature of the present general inventive concept, there is provided a user terminal to perform image communication, the user terminal including an output unit outputting a captured image without performing left-and-right reversion on the captured image if the captured image includes a symbol.

According to another feature of the present general inventive concept, there is provided an image camera including an image generation unit generating a captured image and a camera control unit transmitting the captured image to a user terminal without performing left-and-right reversion on the captured image if the captured image includes a symbol.

According to another feature of the present general inventive concept, there is provided a computer-readable recording medium having recorded thereon a program to execute an image communication method including outputting a captured image without performing left-and-right reversion on the captured image when the captured image includes a symbol.

According to another feature of the present general inventive concept, there is provided a computer-readable recording medium having recorded thereon a program to execute an image communication method including generating a captured image and transmitting the captured image to a user terminal without performing left-and-right reversion on the captured image if the captured image includes a symbol.

According to an exemplary embodiment of the present general inventive concept, an image communication method and apparatus can be provided which controls left-and-right reversion of a captured image and outputs the result according to whether the captured image includes a symbol.

According to another exemplary embodiment of the present general inventive concept, an image communication apparatus comprises an image camera to capture a real-time image, and a user terminal to output the captured image, wherein at least one of the image camera and the user terminal performs a symbol detection to detect a symbol included with the captured image, and controls an orientation of the captured image based on the symbol detection.

BRIEF DESCRIPTION OF THE DRAWINGS

The above and other features and advantages of the present general inventive concept will become more apparent by describing in detail exemplary embodiments thereof with reference to the attached drawings in which:

FIGS. 4A through 4D illustrate images output from the image communication apparatus according to an exemplary embodiment of the present general inventive concept;

DETAILED DESCRIPTION OF THE EMBODIMENTS

Figure 1:
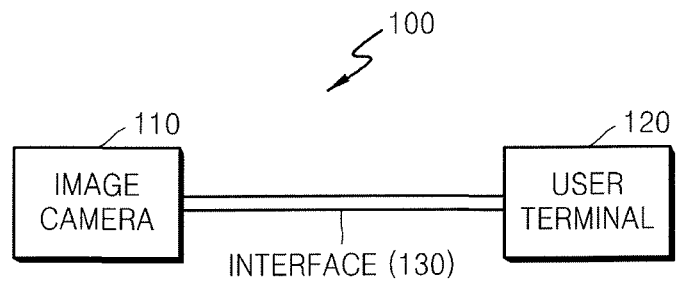
FIG. 1 is a block diagram of an image communication apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image communication apparatus 100 according to an exemplary embodiment of the present general inventive concept. The image communication apparatus 100 may perform image communication with a partner terminal (not shown) over a communication network. Referring to FIG. 1, the image communication apparatus 100 includes an image camera 110, a user terminal 120, and an interface 130.

The image camera 110 photographs an image of a user to be communicated, and communicates the captured image to the user terminal 120. The image camera 110 may be at least one of a camcorder, such as a Webcam, and a camera. Further, the image camera 110 may be separately connected to the user terminal 120, or the image camera 110 and the user terminal 120 may be formed as a single integral unit.

The image camera 110 communicates a video stream generated by capturing a real-time image of the user to the user terminal 120 on a real-time basis through the interface 130.

The interface 130 is an electrical path that interconnects the image camera 110 and the user terminal 120 to transmit and to receive information or a signal, and may include a Universal Serial Bus (USB) or Institute of Electrical and Electronics Engineers (IEEE) 1394 interface.

The user terminal 120 may output the captured image on a screen. The user terminal 120 may also communicate the captured image to the partner terminal. The user terminal 120 may include, but is not limited to, a Personal Computer (PC), a notebook, a Personal Digital Assistant (PDA), a Portable Media Player (PMP), a cellular phone, and a smart phone.

Additionally, the user terminal 120 receives the video stream from the image camera 110 through the interface 130 and may output the video stream. For example, the user terminal 120 may display the video stream on a display screen, or may communicate the video stream to the partner terminal over the communication network, thereby outputting the captured image.

As mentioned above, although the image camera 110 and the user terminal 120 are shown as separate units that are connected through the interface 130 in FIG. 1, they may also be integrated as a single unit without limiting the present general inventive concept.

In at least one exemplary embodiment of the present general inventive concept, when a symbol is included in the captured image, the user terminal 120 may output the original captured image without performing left-and-right reversion on the captured image. Accordingly, the user terminal may reproduce the real-time image when the captured image includes the symbol. To this end, either the image camera 110 or the user terminal 120 may determine whether the captured image includes a symbol, as discussed in greater detail below.

Accordingly, in at least one exemplary embodiment of the present general inventive concept, at least one of the image camera 110 and the user terminal 120 performs a symbol detection to detect a symbol included with the captured image, and controls an orientation of the captured image based on the symbol detection. When the captured image includes the symbol, the captured image is output without performing a left-right reversion to reproduce the real-time image. However, when the capture image excludes the symbol, the captured image is left-right reversed to generate a mirror image of the real-time image.

In at least one exemplary embodiment of the present general inventive concept, the user terminal 120 may determine whether a symbol is included in the captured image. In this case, the image camera 110 communicates the captured image to the user terminal 120 without performing left-and-right reversion on the captured image. The user terminal 120 receives the video stream from the image camera 110 through the interface 130 on a real-time basis and captures the video stream at predetermined time intervals and/or random time intervals. The image obtained by the image camera 110 may be either a moving image or a still image.

The user terminal 120 analyzes the image to determine whether a symbol is included in the image, and if so, the user terminal 120 outputs the captured image input from the image camera 110 to a display screen and/or communicates the same to the partner terminal, without left-and-right reversing the captured image.

In another exemplary embodiment of the present general inventive concept, the image camera 110 may determine whether the captured image includes a symbol. In this case, the image camera 110 performs left-and-right reversion on the captured image according to the determination result, and communicates the captured image to the user terminal 120. Accordingly, the user terminal 120 outputs the captured image received from the image camera 110 without performing left-and-right reversion on the captured image.

In another exemplary embodiment of the present general inventive concept, once the user terminal 120 determines whether the captured image includes a symbol and informs the image camera 110 of the determination result, the image camera 110 may perform left-and-right reversion on the captured image according to the determination result.

In other words, when the image camera 110 generates the captured image and communicates the captured image to the user terminal 120 without performing left-and-right reversion on the captured image, the user terminal 120 captures the captured image received from the image camera 110 to determine whether the captured image includes a symbol, and generates control information as the determination result.

The user terminal 120 communicates the control information to the image camera 110 through the interface 130. The image camera 110 receives the control information from the user terminal 120, and according to the control information, communicates the captured image to the user terminal 120 without performing left-and-right reversion on the captured image or performs left-and-right reversion on the captured image and communicates the left-and-right reverse image to the user terminal 120.

According to an exemplary embodiment of the present general inventive concept, when the captured image includes a symbol, such as a character or a number, the captured image is output on the screen of the user terminal 110 and/or the partner terminal without undergoing left-and-right reversion, thereby allowing a user and/or a partner to read the symbol included in the captured image without any difficulty.

Figure 2:
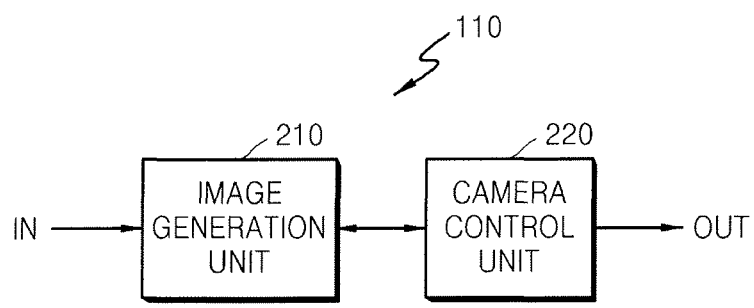
FIG. 2 is a block diagram of an image camera shown in FIG. 1.

FIG. 2 is a block diagram of the image camera 110 shown in FIG. 1. Referring to FIG. 2, the image camera 110 includes an image generation unit 210 and a camera control unit 220.

Although not shown in FIG. 2, an interface unit (not shown) to connect the image camera 110 with an external device may be provided in the image camera 110.

The image camera 110 may further include a memory (not shown) to store programs necessary to execute various functions of the image camera 110 or executing the image communication method according to the present general inventive concept. The memory may be a storage medium such as an Electrically Erasable Programmable Read-Only Memory (EEPROM). One or more of quality information and a product identification (ID) or version information, which are default values of an image sensor and commands or programs capable of driving the camera control unit 220, may be stored in the memory.

The image generation unit 210 photographs an object, thus generating a captured image and performing signal-processing on the captured image. Although not shown in FIG. 2, a lens, an image sensor, an Image Signal Processor (ISP), and the like may be further included in the image generation unit 210. The lens delivers information about the object to the image sensor. The image sensor may include, but is not limited to, a Charge Coupled Device (CCD) and a Complementary Metal Oxide Semiconductor (CMOS), to form an image on the image sensor. The image sensor converts light incoming through the lens into an electrical signal. The ISP performs, on the captured image, signal-processing including one or more of Auto Exposure (AE), Auto White Balance (AWB), color recovery, correction, sharpening, gamma correction, and lens shading correction.

The image generation unit 210 communicates the signal-processed image to the camera control unit 220.

The camera control unit 220 controls all operations of the image camera 110 according to a user input from a user interface (not shown) or under the control of the user terminal 120 connected with the image camera 110. The camera control unit 220 may include an Arithmetic Logic Unit (ALU) to perform calculations and a register to temporarily store data and commands.

The camera control unit 220 may perform, on the captured image received from the ISP, additional signal-processing, such as scaling.

The camera control unit 220 communicates the captured image, which has been additionally signal-processed, to the user terminal 120 through the interface 130, such as a USB.

In an exemplary embodiment of the present general inventive concept, the image camera 110 may directly determine whether the captured image includes a symbol. In this case, the camera control unit 220 may obtain an image by capturing the captured image at predetermined time intervals or random time intervals. The captured image may include a still image or a moving image. For exemplary purposes, FIG. 2 will be described according to a captured still image.

The camera control unit 220 determines whether the still image includes a symbol. In at least one exemplary embodiment, the camera control unit 220 extracts a symbol region from the still image and compares a symbol included in the symbol region with a symbol previously stored in a database (not shown) to determine whether the still image includes the symbol.

According to the determination result of whether or not the still image includes a symbol, the camera control unit 220 performs left-and-right reversion on the captured image, or communicates the captured image to the user terminal 120 without performing left-and-right reversion on the captured image. The user terminal 120 outputs the image received from the image camera 110 without performing left-and-right reversion on the image.

In another exemplary embodiment, the user terminal 120 determines whether the captured image includes a symbol, generates a control command as the determination result, and communicates the control command to the image camera 110 through the interface 130. In this case, according to the control command received from the user terminal 120, the camera control unit 220 performs left-and-right reversion on the additionally signal-processed captured image and communicates the left-and-right reverse image to the user terminal 120, or communicates the additionally signal-processed captured image to the user terminal 120 without performing left-and-right reversion on the additionally signal-processed captured image.

That is, if the control information indicates that the captured image includes a symbol, the image camera 110 communicates the captured image to the user terminal 120 without performing left-and-right reversion on the captured image. However, if the control information indicates that the captured image does not include a symbol, the image camera 110 performs left-and-right reversion on the captured image, and communicates the left-and-right reverse image to the user terminal 120. The image camera 110 may also communicates the captured image to the user terminal 120 according to an output scheme which is preset by the user using a user interface, or a predetermined output scheme which is set by default.

As such, according to an exemplary embodiment of the present general inventive concept, the image camera 110 may perform left-and-right reversion on the captured image and transmit the left-and-right reverse to the user terminal 120, or transmit the captured image to the user terminal 120 without performing left-and-right reversion on the captured image, according to the control command received from the user terminal 120.

According to another exemplary embodiment of the present general inventive concept, the image camera 110 may directly determine whether the still image includes a symbol, and may communicate the captured image to the user terminal 120 after performing left-and-right reversion on the captured image or without performing the left-and-right reversion on the captured image according to the determination result.

Figure 3:
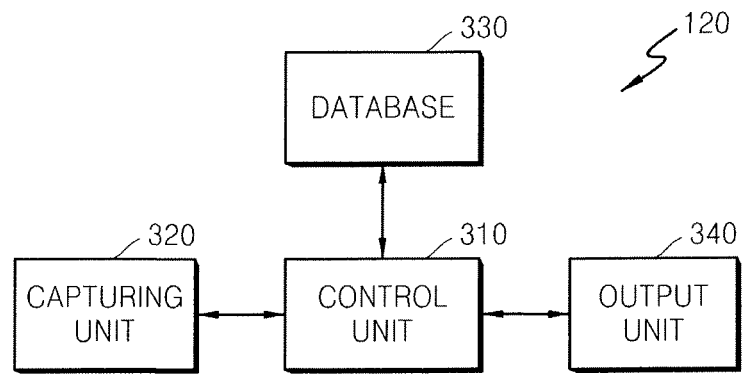
FIG. 3 is a block diagram of a user terminal shown in FIG. 1.

FIG. 3 is a block diagram of the user terminal 120 shown in FIG. 1. Referring to FIG. 3, the user terminal 120 may include a control unit 310, a capturing unit 320, a database 330, and an output unit 340.

Although not shown in FIG. 3, the user terminal 120 may further include an interface unit to communicate with the image camera 110. The user terminal 120 may receive the video stream generated by photographing the user from the image camera 110 on a real-time basis through the interface unit.

The capturing unit 320 obtains an image by capturing the video stream received from the image camera 110 at predetermined time intervals or random time intervals. The captured image may include a still image or a moving image. For exemplary purposes, FIG. 3 will be described according to a captured still image. The capturing unit 320 may include a timer (not shown) to measure a time interval.

The database 330 stores a symbol such as a character, a number, an indication, or the like.

The output unit 340 outputs the captured image to reproduce the real-time image, or the left-and-right reverse thereof. The output unit 340 may include at least one screen (not shown) to display the captured image and a communication unit (not shown) to communicate the captured image to the partner terminal (not shown).

The screen may output an overall state of the user terminal 120, or information input by the user through a user interface (not shown).

The communication unit, connected with the partner terminal, may communicate over at least one of a wired and wireless network to perform wired or wireless communication, respectively. The communication unit may transmit and/or receive information from a server by using a Wireless Local Area Network (WLAN). The WLAN may include, but is not limited to, Wireless Broadband (WiBro) or $3^{rd}$ Generation (3G) or 4G communication technology. The communication unit may also transmit and/or receive information using at least one of Bluetooth, Zigbee, Wi-Fi, wireless USB, Radio-Frequency Identification (RFID) technology, and infra-red communication technology based on Infrared Data Association (IrDA).

The control unit 310 may control all operations of the user terminal 120 to implement the image communication method according to the present general inventive concept.

In an exemplary embodiment of the present general inventive concept, the user terminal 120 may determine whether the captured image includes a symbol. To this end, the control unit 310 determines whether an image obtained by the capturing unit 320, for example a still image, includes a symbol. The control unit 310 may determine whether the captured image includes a symbol by using various algorithms.

In at least one exemplary embodiment, the control unit 310 may extract the symbol region, which is a region including the symbol in the captured image, by using an image processing method, such as a top-hat operation. The control unit 310 may modify the symbol region, for example, by using pen-point correction, smoothing, filtering, and the like, to allow the symbol included in the symbol region to be read easily. The control unit 310 may group the symbol included in the symbol region in meaningful units, e.g., in units of words, and normalize the symbol region. Normalization of the symbol region means adjustment of the position, size, gradient, and bottom line of the symbol.

The control unit 310 may determine whether the captured still image includes a symbol by comparing the symbol included in the symbol region with a symbol previously stored in the database 330. In some cases, the control unit 310 may correct the symbol included in the captured still image with the symbol previously stored in the database 330.

In an exemplary embodiment of the present general inventive concept, the control unit 310 may control the output unit 340 to output the captured still image without performing left-and-right reversion on the still image or output the left-and-right reverse thereof according to whether the captured still image includes a symbol.

The control unit 310 may control the output unit 340 to output the captured image according to an output scheme which is preset by the user or an output scheme which is set by default. The user-set output scheme or the default-set output scheme may be one or more of a scheme to output the captured image without performing left-and-right reversion on the captured image and a scheme to perform left-and-right reversion on the captured image and outputting a mirror image thereof.

In another exemplary embodiment of the present general inventive concept, the control unit 310 may generate control information indicating whether the still image includes a symbol and transmit the control information to the image camera 110 through the interface 130, instead of controlling the output unit 340 according to whether the still image includes a symbol.

The image camera 110 receives the control information from the control unit 310 of the user terminal 120 and communicates the captured image to the user terminal 120 through the interface 130 after performing left-and-right reversion on the captured image. The image camera 110 may also communicate the captured image to the user terminal 120 without performing left-and-right reversion on the captured image. In this case, the control unit 310 controls the output unit 340 to output the captured image received from the image camera 110 without performing left-and-right reversion on the captured image.

According to an exemplary embodiment of the present general inventive concept, the user terminal 120 may generate a control command indicating whether the captured image includes a symbol, and may output the control command to the image camera 110.

According to another exemplary embodiment of the present general inventive concept, the user terminal 120 may determine whether the captured image includes a symbol, and may communicate the captured image after performing left-and-right reversion on the captured image. The user terminal 120 may also communicate the captured image without performing left-and-right reversion on the captured image according to the determination result.

FIGS. 4A through 4D illustrate images output from the image communication apparatus 100 according to an exemplary embodiment of the present general inventive concept.

FIG. 4A and FIG. 4C illustrate captured images generated by photographing a user with the image camera 110. FIG. 4B and FIG. 4D illustrate images output from the image communication apparatus 100 when the captured images are as shown in FIG. 4A and FIG. 4C, respectively.

In an exemplary embodiment of the present general inventive concept, the image communication apparatus 100 determines whether the captured image includes a symbol. If the image communication apparatus 100 determines that the captured image includes a symbol, the image communication apparatus 100 outputs the captured image without performing left-and-right reversion on the captured image. However, if the image communication apparatus 100 determines that the captured image does not include a symbol, the image communication apparatus 100 outputs the captured image after. The image communication apparatus 100 may also output the captured image without performing left-and-right reversion on the captured image according to an output scheme set by a user or an output scheme set by default.

It can be seen from FIG. 4A that the captured image includes a symbol "Mr. Kim". Regarding the captured image shown in FIG. 4A, the image communication apparatus 100 determines that the captured image includes a symbol and outputs the captured image which is not left-and-right reversed as shown in FIG. 4D. In this case, the image as shown in FIG. 4B is output on a screen (not shown) of the image communication apparatus 100. The image which is not left-and-right reversed may also be communicated to the partner terminal (not shown), allowing the user and/or the partner to easily comprehend the symbol, "Mr. Kim".

It can be seen from FIG. 4C that the captured image does not include a symbol. Accordingly, the image communication apparatus 100 determines that the captured image shown in FIG. 4C does not include a symbol, and outputs the captured image according to an output scheme set by the user. The image communication apparatus 100 may also output the captured image according to a predetermined output scheme set by default in the image communication apparatus 100.

In an exemplary embodiment of the present general inventive concept, if the user-set output scheme or the default-set output scheme is a scheme to perform left-and-right reversion on the captured image to output a mirror image, the image communication apparatus 100 may output the left-and-right reverse image of the captured image, as shown in FIG. 4D, thereby generating a mirror image of the real-time image.

Figure 5:
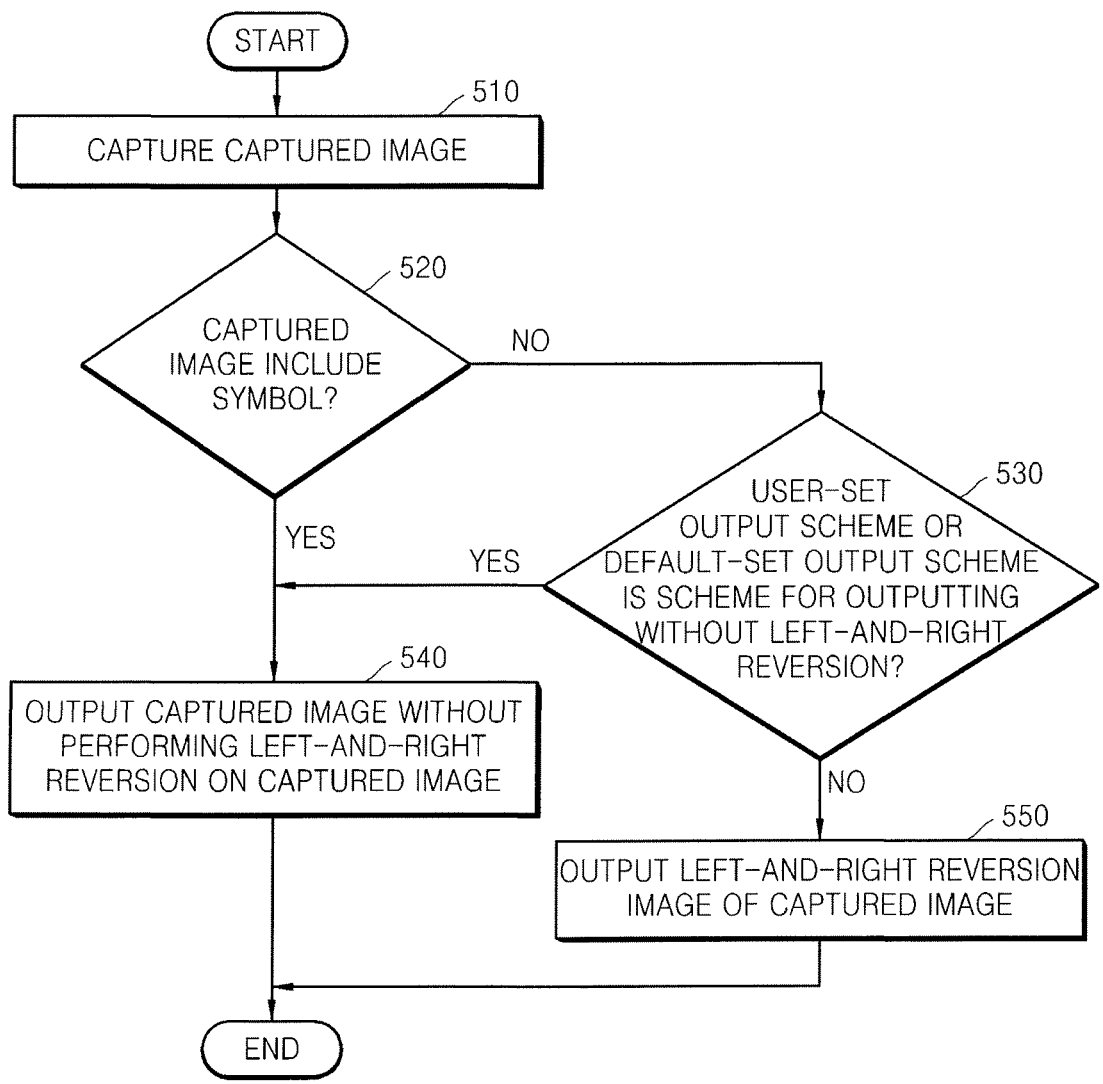
FIG. 5 is a flowchart illustrating an image communication method according to an exemplary embodiment of the present general inventive concept.

FIG. 5 is a flowchart illustrating an image communication method according to an exemplary embodiment of the present general inventive concept. Referring to FIG. 5, the image communication apparatus 100 generates a captured image composed of a video stream by photographing a user in real-time. The image communication apparatus 100 captures the real-time image at predetermined time intervals or random time intervals to generate the captured image in operation 510.

The image communication apparatus 100 determines whether an image includes a symbol in operation 520. As mentioned above, the image may be a still image or a moving image. For exemplary purposes, FIG. 5 will be described according to capturing a still image. Accordingly, if the image communication apparatus 100 determines that the still image includes a symbol, the image communication apparatus 100 outputs the captured image without performing left-and-right reversion on the captured image, in operation 540.

Otherwise, if the image communication apparatus 100 determines that the still image does not include a symbol, the image communication apparatus 100 determines whether the user-set output scheme or the default-set output scheme is a scheme to output the captured image without performing left-and-right reversion on the captured image, in operation 530.

If the user-set output scheme or the default-set output scheme is a scheme to output the captured image without performing left-and-right reversion on the captured image, the image communication apparatus 100 outputs the captured image without performing left-and-right reversion on the captured image, in operation 540. Otherwise, if the user-set output scheme or the default-set output scheme is a scheme to output the captured image after performing left-and-right reversion on the captured image, the image communication apparatus 100 performs left-and-right reversion on the captured image and outputs the left-and-right reverse image of the captured image, in operation 550.

In this way, according to an exemplary embodiment of the present general inventive concept, when the captured image includes a symbol, the captured image can be output without being left-and-right reversed.

Figure 6:
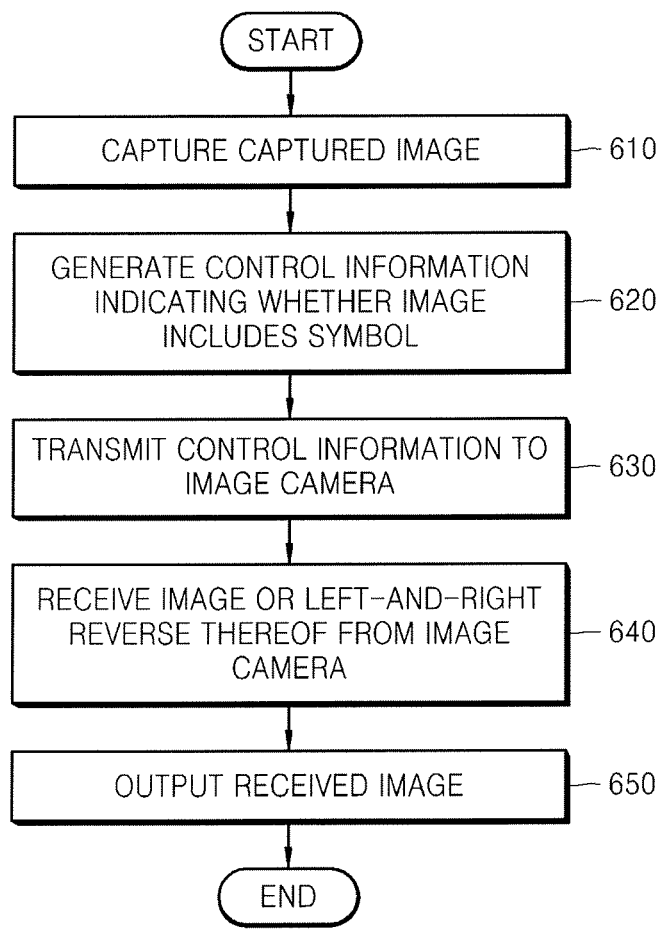
FIG. 6 is a flowchart illustrating an image communication method according to another exemplary embodiment of the present general inventive concept.

FIG. 6 is a flowchart illustrating an image communication method according to another exemplary embodiment of the present general inventive concept. Referring to FIG. 6, the image camera 110 included in the image communication apparatus 100 generates a captured image composed of a video stream by photographing a user in real-time, and communicates the captured image to the user terminal 120.

The user terminal 120 captures the real-time image received from the image camera 110 to generate a captured image in operation 610. As mentioned above, the image may be a still image or a moving image. For exemplary purposes, FIG. 6 will be described according to capturing a still image. Accordingly, the user terminal 120 determines whether the still image includes a symbol, and generates control information indicating whether the still image includes a symbol in operation 620.

The user terminal 120 communicates the control information to the image camera 110 in operation 630.

The image camera 110 communicates the captured image which has not been left-and-right reversed, i.e., a reproduced real-time image, or the left-and-right reverse image of the captured image, i.e., a mirror image of the real-time image, to the user terminal 120 according to the control information. The user terminal 120 receives the captured image or the left-and-right reverse thereof from the image camera 110 in operation 640, and outputs the received image without performing left-and-right reversion on the received image in operation 650. Accordingly, a symbol included with a captured real-time image may be properly comprehended.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly shown and described with reference to embodiments thereof, it will be understood by one of ordinary skill in the art that various changes in form and detail may be made therein without departing from the spirit and scope of the present general inventive concept as defined by the following claims. Accordingly, the technical spirit and scope of the appended claims are not limited by the disclosed embodiments of the present general inventive concept.

Although a few exemplary embodiments of the present general inventive concept have been shown and described, it would be appreciated by those skilled in the art that changes may be made in these exemplary embodiments without departing from the principles and spirit of the present general inventive concept, the scope of which is defined in the claims and their equivalents.

What is claimed is:

1. An image communication method comprising:
controlling left-and-right reversion of a captured image according to whether the captured image comprises a symbol;
outputting the captured image after performing left-and-right reversion on the captured image when the captured image does not comprise the symbol; and
outputting the captured image without performing left-and-right reversion on the captured image when the captured image comprises the symbol.

2. The image communication method of claim 1, wherein the outputting of the captured image comprises transmitting the captured image to a partner terminal over a communication network.

3. The image communication method of claim 1, wherein the outputting of the captured image comprises displaying the captured image on a screen.

4. The image communication method of claim 1, further comprising capturing the captured image to obtain a still image.

5. The image communication method of claim 4, wherein the capturing of the captured image comprises capturing the captured image at predetermined time intervals to obtain a still image.

6. The image communication method of claim 4, further comprising determining whether the captured still image comprises the symbol.

7. The image communication method of claim 6, wherein the determining of whether the captured still image comprises the symbol comprises:
extracting a symbol region from the captured still image; and
determining whether the captured still image comprises the symbol by comparing the symbol included in the symbol region with a symbol previously stored in a database.

8. The image communication method of claim 6, further comprising outputting the captured image according to at least one of a user-set output scheme and a default-set output scheme if the captured still image does not comprise the symbol.

9. The image communication method of claim 8, wherein the at least one user-set output scheme and the default-set output scheme is at least one of a scheme to output the captured image without performing left-and-right reversion on the captured image, and a scheme to perform left-and-right reversion on the captured image and outputting a mirror image thereof.

10. The image communication method of claim 6, further comprising:
generating control information indicating whether the captured still image comprises a symbol; and
communicating the control information to an image camera through an interface,
wherein capturing the captured image comprises receiving a video stream from the image camera.

11. The image communication method of claim 10, further comprising receiving the captured image that has not been left-and-right reversed from the image camera through the interface when the control information indicates that the captured still image comprises the symbol.

12. The image communication method of claim 11, wherein the outputting of the captured image without performing left-and-right reversion on the captured image comprises outputting the captured image received from the image camera through the interface without performing the left-and-right reversion on the captured image.

13. An image communication method comprising:
generating a captured image;
controlling left-and-right reversion of the captured image according to whether the captured image comprises a symbol;
communicating the captured image to a user terminal after performing left-and-right reversion on the captured image when the captured image does not comprise the symbol; and
communicating the captured image to the user terminal without performing left-and-right reversion on the captured image when the captured image comprises the symbol.

14. The image communication method of claim 13, further comprising transmitting the captured image to the user terminal according to at least one of a transmission scheme that is set by a user, or a transmission scheme that is set by default when the captured image does not comprise the symbol.

15. The image communication method of claim 14, wherein the transmitting of the captured image to the user terminal comprises one of transmitting the captured image to the user terminal without performing left-and-right reversion on the captured image, and transmitting a mirror image, which is a left-and-right reverse image of the captured image, to the user terminal.

16. The image communication method of claim 13, further comprising determining whether the captured image comprises the symbol.

17. The image communication method of claim 13, wherein the transmitting of the captured image to the user terminal comprises transmitting the captured image to the user terminal through an interface.

18. The image communication method of claim 17, further comprising receiving control information indicating whether the captured image comprises the symbol from the user terminal through the interface, wherein the transmitting of the captured image to the user terminal comprises transmitting the captured image to the user terminal without performing left-and-right reversion on the captured image when the control information indicates that the captured image comprises the symbol.

19. A user terminal to perform image communication, the user terminal comprising an output unit to control left-and-right reversion of a captured image according whether the captured image comprises a symbol, to output the captured image after performing left-and-right reversion on the captured image when the captured image does not comprise the symbol, and to output the captured image without performing left-and-right reversion on the captured image when the captured image comprises the symbol.

20. The user terminal of claim 19, wherein the output unit comprises a communication unit to communicate the captured image to a partner terminal over a communication network.

21. The user terminal of claim 19, wherein the output unit performs image communication comprising a screen which displays the captured image.

22. The user terminal of claim 19, further comprising a capturing unit to generate the captured image to obtain a still image.

23. The user terminal of claim 22, wherein the capturing unit captures the captured image at predetermined time intervals to obtain a still image.

24. The user terminal of claim 22, further comprising a control unit determining whether the captured still image comprises the symbol.

25. The user terminal of claim 24, further comprising a database previously storing a symbol, wherein the control unit performs image communication which comprises extracting a symbol region from the captured still image, and comparing a symbol included in the symbol region with the symbol previously stored in the database to determine whether the captured still image comprises the symbol.

26. The user terminal of claim 24, wherein the control unit controls the output unit to output the captured image according to an output scheme that is set by at least one of a user and an output scheme that is set by default when determining that the captured still image does not comprise the symbol.

27. The user terminal of claim 26, wherein the at least one output scheme set by the user and the output scheme set by default is at least one of a scheme to output the captured image without performing left-and-right reversion on the captured image, and a scheme to perform left-and-right reversion on the captured image and to output a mirror image that is a left-and-right reverse image of the captured image.

28. The user terminal of claim 24, wherein:

the capturing unit receives a video stream from an image camera through an interface to generate the captured image; and the user terminal communicates information to and receives information from the image camera through the interface, and the control unit generates control information indicating whether the captured still image comprises the symbol and communicates the control information to the image camera through the interface.

29. The user terminal of claim 28, wherein the user terminal performs image communication to receive the captured image that has not been left-and-right reversed from the image camera through the interface when the control information indicates that the captured still image comprises the symbol.

30. The user terminal of claim 29, wherein the output unit performs image communication that comprises outputting the captured image received from the image camera through the interface without performing left-and-right reversion on the captured image.

31. An image camera comprising:

an image generation unit to generate a captured image; and a camera control unit to control left-and-right reversion of the captured image according to whether the captured image comprises a symbol, to communicate the captured image to a user terminal after performing left-and-right reversion on the captured image when the captured image does not comprise the symbol, and to communicate the captured image to the user terminal without performing left-and-right reversion on the captured image when the captured image comprises the symbol.

32. The image camera of claim 31, wherein the camera control unit communicates the captured image to the user terminal according to at least one of a transmission scheme set by a user, and a transmission scheme set by default, when the captured image does not comprise the symbol.

33. The image camera of claim 32, wherein the user-set output scheme and the default-set output scheme are at least one of a scheme to transmit the captured image to the user terminal without performing left-and-right reversion on the captured image and a scheme to transmit a mirror image which is a left-and-right reverse image of the captured image to the user terminal.

34. The image camera of claim 31, wherein the camera control unit determines whether the captured image comprises the symbol.

35. The image camera of claim 31, wherein the camera control unit communicates the captured image to the user terminal through an interface.

36. The image camera of claim 35, wherein the interface receives control information indicating whether the captured image comprises the symbol from the user terminal, and when the control information indicates that the captured image comprises the symbol, the camera control unit communicates the captured image to the user terminal through the interface without performing left-and-right reversion on the captured image.

37. A non-transitory computer-readable recording medium having recorded thereon a program to execute an image communication method comprising:

controlling left-and-right reversion of a captured image according to whether the captured image comprises a symbol;

outputting the captured image after performing left-and-right reversion on the captured image when the captured image does not comprise the symbol; and outputting the captured image without performing left-and-right reversion on the captured image when the captured image comprises the symbol.

38. A non-transitory computer-readable recording medium having recorded thereon a program to execute an image communication method comprising:

generating a captured image;

controlling left-and-right reversion of the captured image according to whether the captured image comprises a symbol;

transmitting the captured image to a user terminal after performing left-and-right reversion on the captured image when the captured image comprises the symbol; and transmitting the captured image to the user terminal without performing left-and-right reversion on the captured image when the captured image comprises the symbol.

39. An image communication apparatus, comprising:

an image camera to capture a real-time image; and a user terminal to output the captured image, wherein at least one of the image camera and the user terminal performs a symbol detection to detect a symbol included with the captured image, and controls a left-right reversion of the captured image based on the symbol detection, wherein the captured image is output without performing a left-right reversion to reproduce the real-time image when the captured image comprises the symbol, and wherein the captured image is output after performing left-right reversion to generate a mirror image of the real-time image when the captured image does not comprise the symbol.

* * * * *